United States Patent [19]

Cunnell

[11] 4,086,985
[45] May 2, 1978

[54] DISC BRAKE OPERATING PISTON

[75] Inventor: Michael Derek Cunnell, Salisbury, England

[73] Assignee: Lucas Industries Limited, Birmingham, England

[21] Appl. No.: 722,404

[22] Filed: Sep. 13, 1976

[30] Foreign Application Priority Data

Sep. 18, 1975  United Kingdom ............... 38373/75

[51] Int. Cl.² .......................................... F16D 55/18
[52] U.S. Cl. ...................................... 188/72.4; 92/109;
188/73.5; 188/370
[58] Field of Search .................... 188/72.4, 72.1, 72.5,
188/72.6, 73.5, 73.1, 370, 264 G, 251 R, 251 A,
73.2, 71.1; 92/107, 108, 109, 248, 172, 165 R,
170, 208, 212, 213, 223

[56] References Cited

U.S. PATENT DOCUMENTS

| 2,295,521 | 9/1942 | Payne et al. ........................... 92/248 |
| 3,139,010 | 6/1964 | Herbst .................................... 92/248 |
| 3,497,038 | 2/1970 | Schrader et al. ..................... 188/370 |

FOREIGN PATENT DOCUMENTS

| 2,149,742 | 4/1972 | Germany ............................. 188/73.5 |
| 2,134,940 | 1/1973 | Germany ............................. 188/71.1 |

*Primary Examiner*—Trygve M. Blix
*Assistant Examiner*—Douglas C. Butler

[57] ABSTRACT

A disc brake operating piston includes a hollow, cylindrical body which is open at one end thereof and is closed at its opposite end by an integral base member. The body is formed of a synthetic resin material and the base member is provided with an upstanding projection which is fixed relative to the base member and which extends to a position for engagement, in use, with the backing member of a disc brake friction pad. At least part of the projection is defined, over the whole length thereof, within an area bounded by a circle concentric with the body and having a radius up to one half of the radius of the bore in the body at the base member.

6 Claims, 10 Drawing Figures

DISC BRAKE OPERATING PISTON

This invention relates to a disc brake operating piston.

A disc brake operating piston, according to the invention, includes a hollow, cylindrical body which is open at one end thereof and closed at its opposite end by an integral base member, the body being formed of a synthetic resin material and said base member being provided with an upstanding projection which is fixed relative to the base member and which extends to a position for engagement, in use, with the backing member of a disc brake friction pad, at least part of the projection being defined, over the whole length thereof, within an area bounded by a circle concentric with the body and having a radius up to one half of the radius of the bore in the body at the base member.

Conveniently, said projection extends to the open end of the body.

Preferably, the projection is integral with the base member.

Preferably, the projection includes a plurality of ribs which extend axially from the base member to a position to engage the friction pad backing member in use and join the projection to the cylindrical wall of the body.

Conveniently, said ribs are symmetrically disposed around the projection.

Alternatively, said projection consists of a generally cylindrical pillar.

Conveniently, said pillar is coaxial with the body and is solid.

Alternatively, said pillar is hollow and the bore in the pillar extends to the base member.

Conveniently, said body and projection are moulded in said synthetic resin material and the dimensions of said projections along the length thereof are substantially constant apart from the slight taper required for removal of the body from the tool used to effect the moulding.

Preferably, the surface of the base member remote from the open end of the body is generally planar.

Alternatively, the surface of the base member remote from the open end of the body is formed with a recess, the wall of which defines a circle when considered in transverse cross section, and/or defines a solid of revolution about the axis of the piston.

In the piston described above the body, and preferably the projection, is formed of a synthetic resin material and hence it is necessary to ensure that the material employed has properties consistent with the conditions it will experience in use. Thus, the resin material must be stable to the operating environment of a disc brake (e.g. to hydraulic brake fluids) and must be capable of withstanding the stresses and temperature variations to which it will be subjected when operating a disc brake. Moreover, since the preferred route for producing the piston is by moulding, the synthetic resin material employed will normally also have to be capable of being machined since final shaping and finishing operations will generally be necessary after the moulding operation. Further it is to be understood that the synthetic resin material is intended to replace steel which is conventionally employed in disc brake pistons. Thus it is preferable that the synthetic resin material has a coefficient of thermal expansion which is comparable to that of steel since the piston described is then capable of replacing conventional steel pistons in existing disc brake assemblies without redesign of the assemblies.

Figure 4:
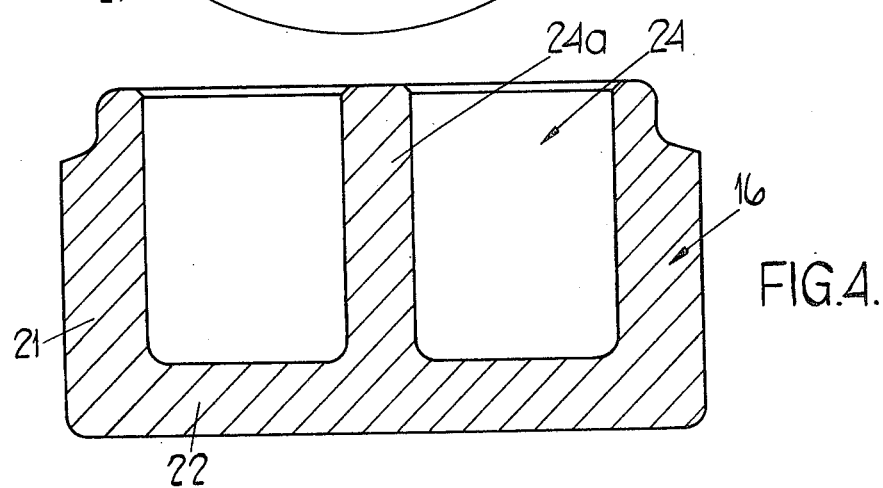
Figure 5:
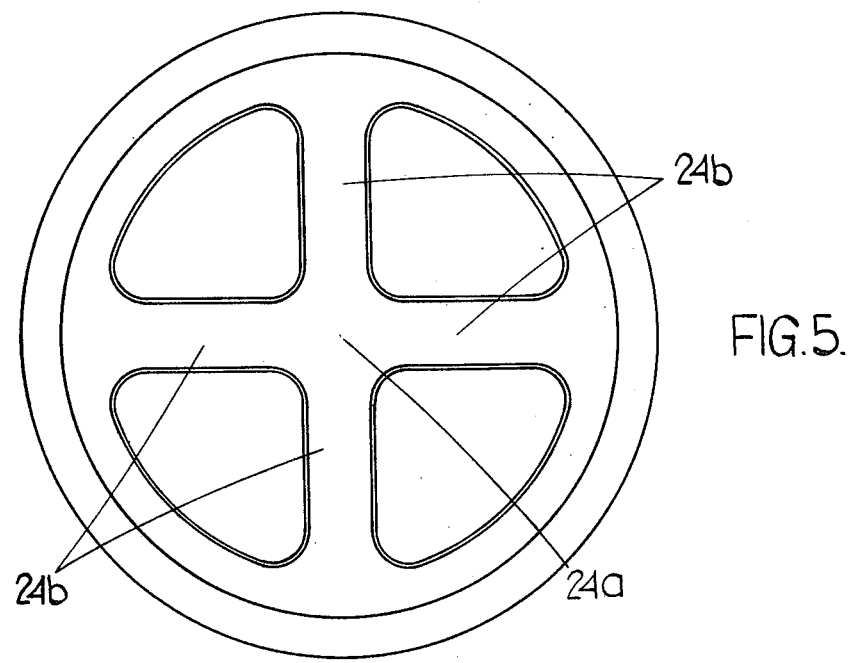
Figure 6:
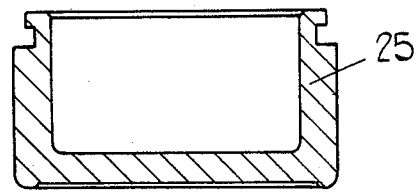
Figure 7:
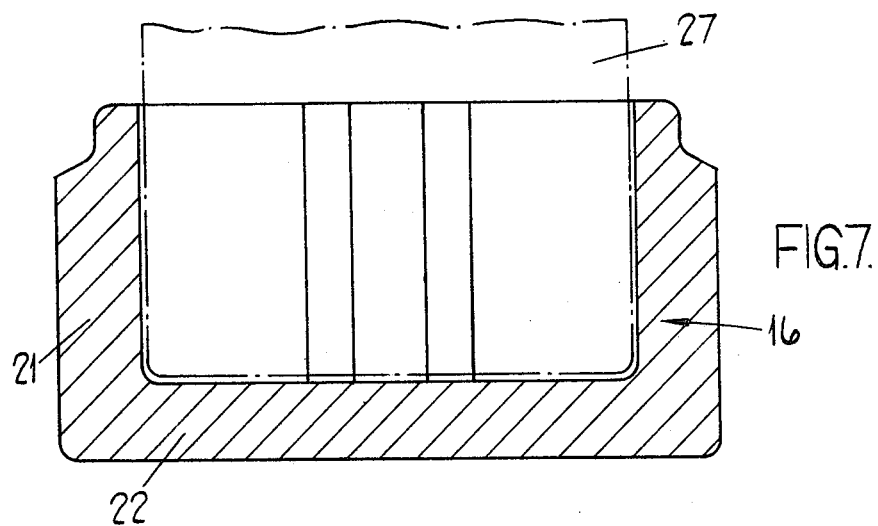
Figure 8:
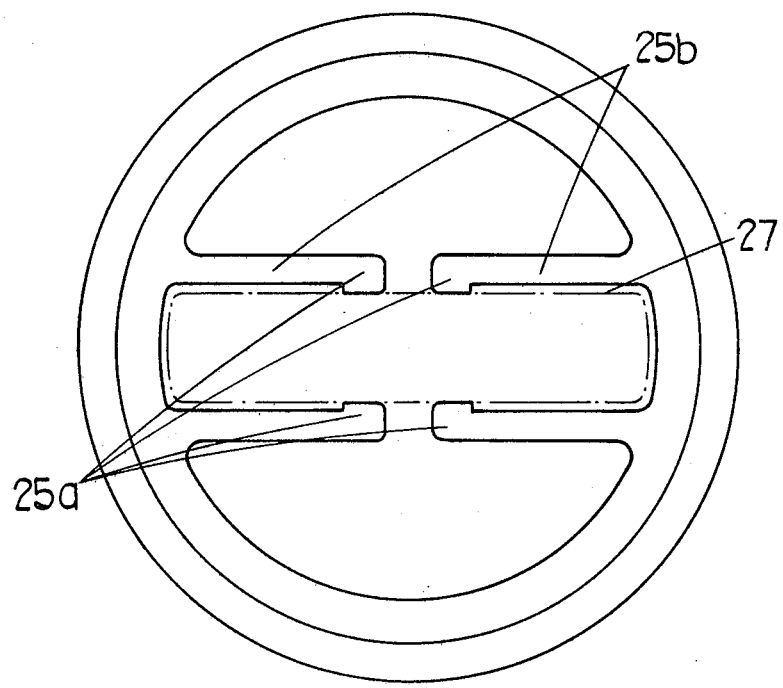
Figure 9:
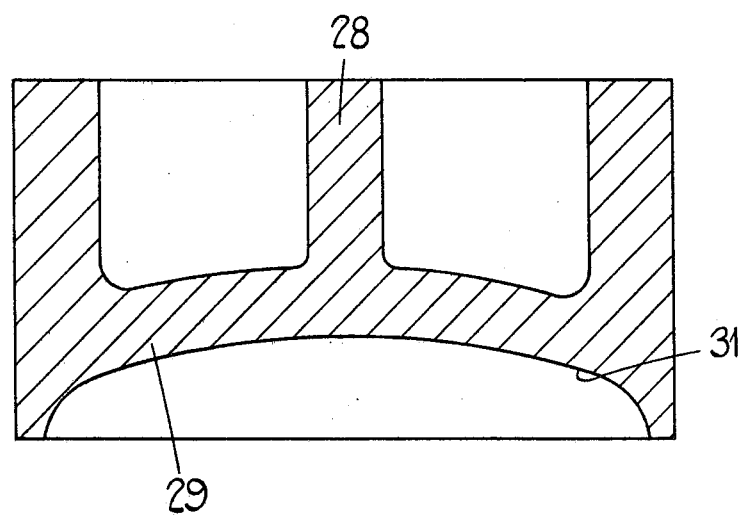
Figure 10:
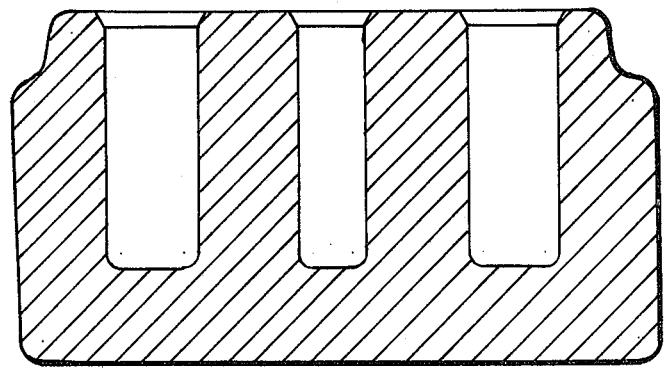

FIGS. 4 and 5 are sectional and plan views respectively of a piston according to a modification of said one example, FIG. 6 is a sectional view of a conventional disc brake operating piston which does not form part of the present invention, FIGS. 7 and 8 are sectional and plan views respectively of a piston according to a further modification of said one example, and, FIGS. 9 and 10 are sectional views illustrating yet further modifications respectively.

Figure 1:
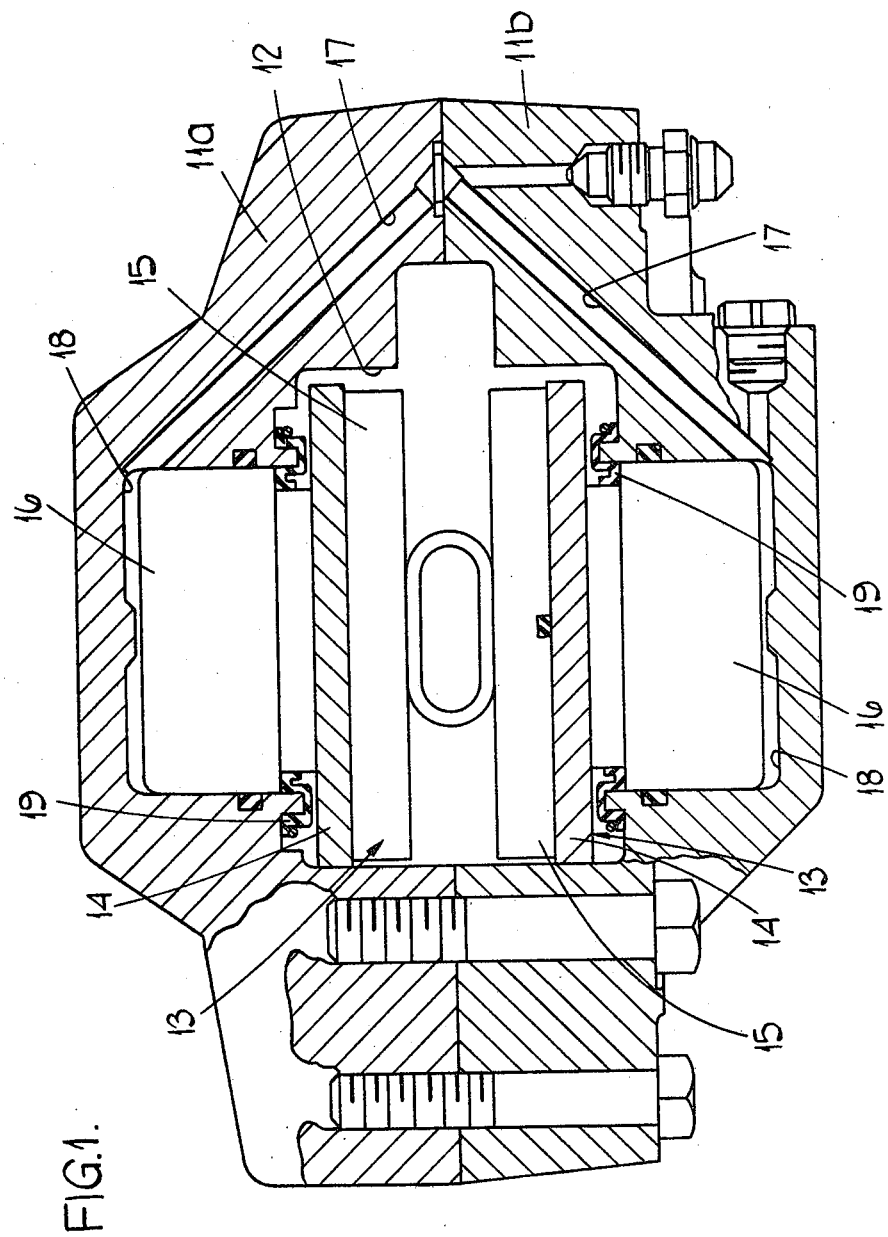
FIG. 1 is a sectional view of part of a road vehicle caliper disc brake employing two operating pistons according to one example of the invention.
Figure 2:
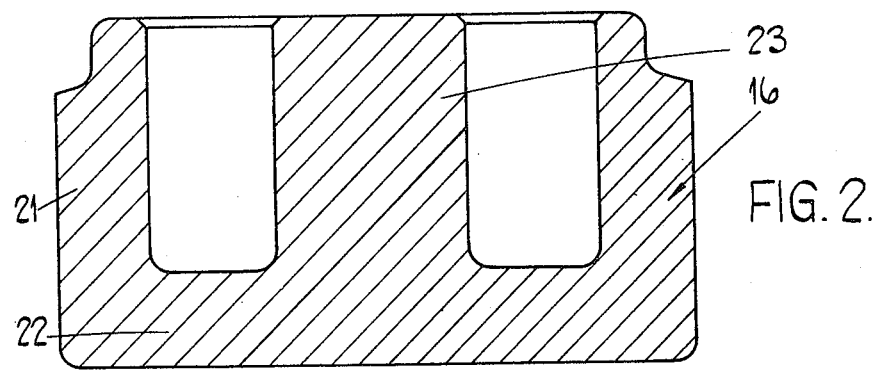
FIGS. 2 and 3 are sectional and plan views respectively of one of the pistons shown in FIG. 1.
Figure 3:
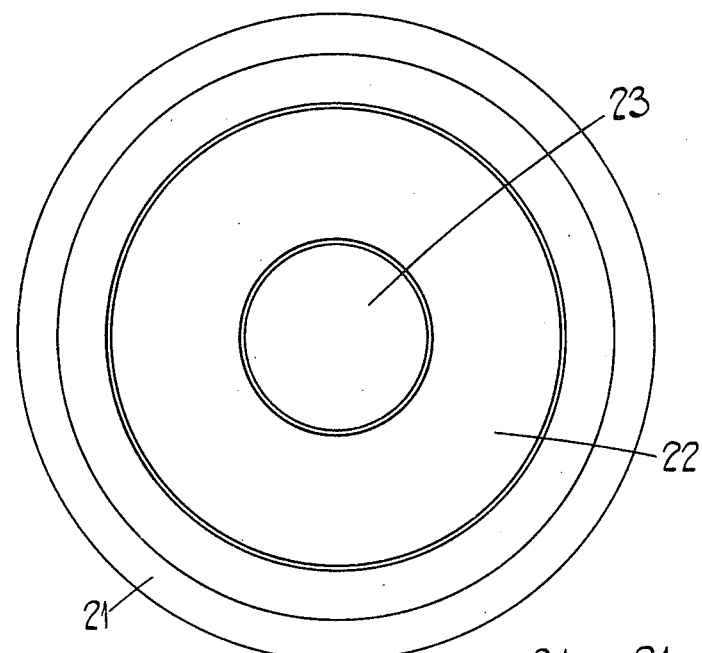

Referring to FIGS. 1 to 3, the disc brake shown in FIG. 1 includes a metal housing formed in two parts 11a, 11b which define therebetween a space 12 for receiving the rotating disc (not shown) of the brake. Also received in the space 12 are a pair of friction plates 13, which define the stationary components of the brake and which each include a metal backing member 14 carrying one or more pads of friction material 15. In use, the plates 13 are urged by respective operating pistons 16 into frictional engagement with opposite surfaces respectively of the rotating disc, the pressurised hydraulic fluid necessary to actuate the pistons 16 being supplied by way of channels 17 formed in the body parts 11a, 11b respectively and communicating with respective piston-receiving recesses 18. In addition, there are provided resilient sealing assemblies 19 which extend between the body parts and their respective pistons 16 to prevent ingress of foreign material into the recesses 18.

As shown in FIGS. 2 and 3, each piston 16 includes a hollow, cylindrical body 21 which is open at one end thereof and closed at its opposite end by an integral base member 22. The external cylindrical surface of the body 21 is stepped inwardly adjacent its open end, while upstanding from the base member 22 is an integral generally cylindrical pillar 23 which is coaxial with the body 21 and at its free end lies flush with the open end surface of the body. In this respect, it is to be appreciated that the free end of the pillar 23 lies flush with the open end surface of the body since in the example shown the friction pad backing members 14 are planar. If, however, non-planar backing members are used then the pillar 23 would terminate such that it engaged the backing member when in use. The body 21 is moulded from a synthetic resin material and hence, although the pillar 23 is shown in FIG. 2 as being of constant diameter along its length, in practice it would be provided with a slight taper to facilitate removal from the moulding tool. Moreover, while in the example shown the pillar 23 is coaxial with the body 21 it will be appreciated that it may be displaced from this axis. However, as this displacement increases, there is a corresponding increase in the unsupported area of the base member 22 and so it is preferred to have the pillar central. However, providing at least part of the pillar extends within an area bounded by a circle concentric with the body and having a radius up to one half of the radius of the bore in the body at the base member 22, a suitable piston can be produced.

In the example described, the synthetic resin material used for each piston 16 is the glass-reinforced and filled phenolic thermosetting moulding composition supplied by Hooker Chemicals and Plastics Corporation of America as type Durez 29502, this material obeying the requirements discussed above as necessary for use in a disc brake. Durez 29502 includes of the order 20% by weight of catalysed phenolic resin, compounded with 55% by weight of Woolastonite and 15% by weight of short glass fibres, with lesser amount of calcium carbonate, titanium dioxide, and charcoal together with a zinc strearate release agent. Alternative materials for the piston 16 include the glass fibre and mineral filled phenolic moulding material supplied by Bakelite Xylonite Ltd., of England as type Xw71685; the glass-reinforced phenolics supplied by Fiberite Corp. of Winona, Minnesota, U.S.A., as tupe Fm4000 series; the glass reinforced and filled condensation products of phenol with aralkyl ethers as supplied by Moulding Powders Ltd., of Wigon, England as Xylok types SX649 and SX652; glass-reinforced epoxy thermosetting compounds also sold by Fiberite; and the polyimides sold by Rhone-Poulence of France as Kinel. While the above materials are intended for compression moulding, their compositions are capable of adjustment to allow them to be injection moulded.

To produce each piston 16, the Durez moulding composition in granular form is initially pre-plasticized in a heated extruder and is then compression moulded at 170° C. After removal from compression moulding tools, the piston is post cured for 16 hours at 170° C and is then cooled and ground to remove the slight taper provided on the cylindrical surface of the body 21 to facilitate separation from the moulding tools. In addition, the grinding operation is arranged to produce a surface finish of 16 microns over the exterior of the piston.

In one practical embodiment, the body of each piston 16, after grinding, had an external diameter of 54 mm, a maximum internal diameter of 38 mm and a height of 29 mm, while the base member 22 of the piston had a minimum thickness of 8 mm and the pillar 23 had a minimum diameter of 16 mm. The piston was produced from an 85 gm shot of the moulding composition described above and, prior to grinding, the external cylindrical surface of the body defined a taper having a 2° included angle. The grinding operation to remove the taper was effected by centreless wet grinding using water or oil and an 80 grit wheel rotating at 7000 r.p.m., the weight of the piston being reduced to 80 gm by the grinding operation. In use, each of the resultant pistons 16 was mounted in its respective recess 18 with the open end of the body 21 and the free end of the pillar 23 engaging the respective friction plate 13 and each was found to be capable of withstanding a maximum hydraulic pressure of 4500 p.s.i., as compared with 400 p.s.i. normally experienced in the particular disc brake concerned. Also the synthetic resin material of the pistons had a coefficient of thermal expansion, 11 to 13 × $10^{-6}$ cm/° C (up to 50° C), similar to that of steel and was unaffected at the most extreme temperature conditions which were experienced in use, i.e. when a maximum temperature of 400° C existed at the open end of each piston and the temperature gradient between the opposite ends of the piston was 150° C. The material had a flexural strength of 10,000 p.s.i. at 20° C and a Young's Modulus of 2.8 × $10^6$ p.s.i. in compression at 20° C.

Referring now to FIGS. 4 and 5, in the modification shown therein each piston 16 is similar to that described above, except that the generally cylindrical pillar 23 is replaced by an upstanding projection 24 which includes a central portion 24a extending along the axis of the piston body 21 and four equi-angularly spaced ribs 24b joining the central portion 24a to the internal surface of the body 21. The projection 24 is therefore of cruciform shape when considered in plan and also is similar to the pillar 23 in that it is formed integrally with the base member 22 and extends to the open end of the body 21. As before, the dimensions of the portion 24a and ribs 24b are substantially constant along the length of the piston, apart from a slight taper provided to facilitate removal from the moulding tools.

While the cruciform shape of FIGS. 4 and 5 is shown co-axial with the body 21, it will be appreciated that it can be displaced from the axis and will give satisfactory support for the base provided at least part of the cruciform extends within the half-radius circle as defined above.

Referring to FIG. 6, the piston shown at 25 is the conventional disc brake operating piston which the pistons described above are intended to replace. The piston 25 is formed of steel, conveniently EN2A cold forming steel, by a forging process and it will be seen that it has a similar external shape to the pistons described above, but is devoid of the internal projections 23, 24. It is, however, to be appreciated EN2A steel has an elastic modulus and flexural strength approximately ten times greater than that of the synthetic resin material employed in the pistons described. In view of this, it has been calculated that in order to produce in said synthetic resin material a piston which has the same overall shape and performance characteristics as the steel piston 25, it is necessary to increase the wall and base thickness of the piston to approximately three times the corresponding dimensions in the steel version. Thus for a piston 26 employing 35000 mm$^3$ of steel, a synthetic resin piston of the same shape requires approximately 55000 mm$^3$ of the resin material. However, by employing the shapes shown in FIGS. 2 to 5 the volume of synthetic resin material required in the piston can be reduced to 45000 mm, while the weight of the piston is only 80 gm as compared with a weight of 260 gm for a comparable steel piston 25. It is also found that, when the pistons 16 are subjected to the hydraulic pressures necessary to operate the associated disc brake, the overall distortion each piston 16 undergoes is similar to that experienced with a comparable steel piston. This means that, where the disc brake is manually operable, the use of the synthetic resin pistons 16 instead of the steel piston 25 has little or no effect on the feel of the brake to the operator. Unlike the steel piston 25, however, the shape of the piston 16 is such that the component of the overall distortion resulting from compression is greater than the component due to bending.

While in the examples quoted the pistons 16 have been mounted on opposite sides of the rotating disc and each directly contacts a friction pad backing member, the invention can also be applied, with advantage, to the arrangement where two pistons are mounted back-to-back within one cylinder mounted on one side of the brake disc. In this case one piston acts normally on the brake pad, while the other carries a link which is attached to the other brake pad, and when hydraulic pressure is applied between the pistons, both pads engage the disc. The link is joined to the piston by engaging a tongue on the link within a slot in a plastic moulding inserted and trapped within the bore of the piston.

Referring to FIGS. 7 and 8, in the further modification shown therein, which is suitable for use in the disc brake assembly described in the preceding paragraph, each piston 16 has four upstanding projections 25a lying within a circle of half the radius of the bore in the body, and each being joined to the internal surface of the body 21 by a rib 25b to form two pairs of parallel arms defining a channel for receiving the tongue 27 (shown dotted) of the link described above, the projections 25a being arranged to engage the tongue 27, with the ribs 25b being spaced therefrom.

It will be noted from FIGS. 2 to 5 and 7 to 8 that the base member 22 of each piston 16 is generally planar at the surface thereof remote from the open end of the body 21 of the piston. However, as an alternative to this arrangement, said surface of each piston 16 can be formed with a recess (not shown), although in this case it is preferable that the wall of the recess should be circular in transverse cross-section, and/or define a solid of revolution about the axis of the piston. Such an alternative is illustrated in FIG. 9 which shows a piston having four equiangularly-spaced ribs 28 which are similar to the ribs 24b of the piston shown in FIGS. 4 and 5 and which project from the convex inner surface of a dished base member 29. The concave outer surface of the member 29 then defines part of a generally part-spherical recess 31. Using the arrangement of this embodiment, the length of the projecting ribs 28 are reduced as compared with the planar base constructions previously described and hence a further saving in the amount of synthetic resin material required to produce the piston can be realised.

Experimental work with the synthetic resin pistons of the invention has indicated that the use of such pistons may make it possible to dispense with the anti-squeal shims and greases normally employed with disc brakes using conventional steel pistons.

It is to be appreciated that other projection designs than those described above can be utilised in the piston of the invention while still imparting the required characteristics to the piston in use, as well as allowing efficient utilisation of resin amounts and hence moulding times. For example, the cylindrical pillar need not be circular in section and/or could be hollow (FIG. 10) so as to expose the base member of the piston.

I claim:

1. An operating piston for a disc brake including a backing member supporting a friction pad, the piston consisting essentially of a cylindrical body which is formed with a blind bore therein such that said body is open at one end of and closed at its opposite end by a shallow integral base member, the body being formed of a synthetic resin material, and a projection upstanding from said base member and also formed of a synthetic resin material, said upstanding projection being fixed relative to the base member and including a plurality of ribs which extend axially from the base member to a position to engage said backing member in use and to join the projection to the cylindrical wall of the body.

2. A piston as claimed in claim 1 wherein said ribs are symmetrically disposed around the projection.

3. A piston as claimed in claim 1, wherein said base member is dished so as to define a convex inner surface from which said ribs project and a concave outer surface enclosing a generally part-spherical recess.

4. An operating piston for a disc brake of the kind including a backing member supporting a friction pad, the piston consisting essentially of a cylindrical body which is formed with a blind bore therein such that said body is open at one end thereof and closed at its opposite end by an integral shallow base member, the body being formed of a synthetic resin material, four angularly spaced projections upstanding from said base member and formed integrally with the base member, each projection extending to a position for engagement, in use, with said backing member and at least part of each projection being defined, over the whole length thereof, within an area bounded by a circle concentric with the body and having a radius up to one half of the radius of the bore in the body at the base member, and two pairs of parallel arms joining the respective projections to the internal surface of the body and defining a channel therebetween.

5. An operating piston for a disc brake of the kind including a backing member supporting a friction pad, the piston consisting essentially of a cylindrical body which is formed with a blind bore therein such that said body is open at one end thereof and closed at its opposite end by an integral shallow base member, the body being formed of a synthetic resin material, and a cylindrical projection upstanding from and fixed to said base member and also formed of a synthetic resin material, said upstanding cylindrical projection having a hollow bore extending to the base member, said projection extending to a position for direct engagement, in sse, with said backing member, at least part of the projection being defined, over the whole length thereof, within an area bounded by a circle concentric with the body and having a radius up to one half of the radius of the bore in the body at the base member.

6. An operating piston for a disc brake of the kind including a backing member supporting a friction pad, the piston consisting essentially of a cylindrical body which is formed with a blind bore therein such that said body is open at one end thereof and closed at its opposite end by an integral shallow base member, the body being formed of a synthetic resin material, and a projection upstanding from said base member and also formed of a synthetic resin material, said upstanding projection being fixed relative to the base member and extending to a position for engagement, in use, with said backing member, at least part of the projection being defined, over the whole length thereof, within an area bounded by a circle concentric with the body and having a radius up to one half of the radius of the bore in the body at the base member, said body and projection being moulded in a moulding tool for synthetic resin material, the dimensions of said projection along the length thereof being substantially constant apart from a slight taper required for removal of the body from the moulding tool.

* * * * *